United States Patent [19]

Lancaster et al.

[11] Patent Number: 4,529,662
[45] Date of Patent: * Jul. 16, 1985

[54] ASBESTOS-FREE SHEET MATERIAL FOR SPIRAL-WOUND GASKETS

[75] Inventors: Robert A. Lancaster, Littleborough; Noel C. McKenzie, Rochdale; Brian Hargreaves, Manchester, all of England

[73] Assignee: T&N Materials Research Limited, Manchester, England

[*] Notice: The portion of the term of this patent subsequent to Jul. 16, 2002 has been disclaimed.

[21] Appl. No.: 550,403

[22] Filed: Nov. 10, 1983

[30] Foreign Application Priority Data

Nov. 20, 1982 [GB] United Kingdom ................ 8233180

[51] Int. Cl.$^3$ ..................... B32B 9/06; B32B 15/04; B65D 53/00
[52] U.S. Cl. .................................. 428/450; 428/454; 428/463; 428/464; 524/35; 524/447; 524/449; 524/443; 277/227; 277/DIG. 6; 162/142; 162/156; 162/164.1; 162/181.7; 162/181.8; 162/181.9
[58] Field of Search ................... 501/95; 106/DIG. 3, 106/DIG. 4, 204; 524/35, 443, 47, 447, 449, 492, 606; 428/237, 283, 454, 450, 463, 464; 277/227, 233, 234, DIG. 6; 162/142, 156, 164.1, 181.7, 181.8, 181.9

[56] References Cited

U.S. PATENT DOCUMENTS 4,317,575 3/1982 Cavicchio ............................ 524/35
4,364,982 12/1982 Gee ................................. 277/227 X
4,443,517 4/1984 Shah ......................... 277/DIG. 6 X

OTHER PUBLICATIONS

Chem. Abstracts, 93: 73257u, (1980), p. 73259; Tracy et al.

Primary Examiner—Joseph L. Schofer
Assistant Examiner—Fred Teskin
Attorney, Agent, or Firm—Cushman, Darby & Cushman

[57] ABSTRACT

Non-asbestos flexible sheet material suitable for use in the manufacture of spiral wound gaskets is made by dewatering on a water-permeable conveyor a layer of aqueous slurry and compressing and drying the dewatered layer, the aqueous slurry employed being one that contains the following ingredients in the following proportions by dry weight:
china clay 20–50%
mica or chlorite 20–50%
graphite 10–40%
cellulose fibres 2–10%
vitreous fibre in wool form 2–10%
synthetic organic polymer binder 2–10%.

2 Claims, No Drawings

ASBESTOS-FREE SHEET MATERIAL FOR SPIRAL-WOUND GASKETS

This invention relates to flexible sheet material suitable for use in the manufacture of gaskets, particularly spiral wound gaskets, which consist of steel V-strip wound spirally with strip formed from flexible sheet material. In such gaskets the sealing surfaces are formed by the alternating edges of the steel strip and the strip of flexible sheet material.

Such material is commonly made of fibres of asbestos (asbestos being a fibrous layer-silicate mineral) bound together with synthetic rubber, which is usually formed from a latex (an aqueous dispersion of the rubber). The material is made with the use of conventional paper-making machinery such as a Fourdrinier machine, and is in fact often called 'paper'.

In the specification of our UK patent application No. 2 079 338A (=EPO No. 43 679A) there is described flexible sheet material suitable for use in the manufacture of spiral wound gaskets and having a non-asbestos base. That material has a basis (85–95% by weight) of a nonfibrous charged-layer-silicate mineral, which is preferably chlorite but may be mica, and includes a minor proportion (2–15% by weight) of organic web-forming fibres, which are preferably cellulosic, and a synthetic rubber as binder (1–10% by weight).

The present invention provides non-asbestos flexible sheet material alternative to that described in our earlier patent application and, at present prices, considerably cheaper.

The material of the invention is made by a conventional paper-making process, in which an aqueous slurry of the various ingredients of the paper is progressively dewatered as a layer on a water-permeable conveyor and the dewatered layer is subsequently compressed and dried. However, the composition of the aqueous slurry employed is new, being (in % by weight of dry solids):
china clay: 20–50
mica or chlorite: 20–50
graphite: 10–50
cellulose fibres: 2–10
vitreous fibre in wool form: 2–10
synthetic organic polymer binder: 2–10

The preferred proportion of mica or chlorite by dry weight of the aqueous slurry is 25–40%. The mica or chlorite provides reinforcement in the finished paper, and the cellulose fibres assist the formation of a web on the water-permeable conveyor. The china clay (sometimes called kaolin) imparts to the finished paper the flexibility appropriate for use in spiral wound gaskets, and during production it improves drainage of the layer on the water-permeable conveyor. The preferred proportion of china clay by dry weight of the aqueous slurry is 25–40%. China clay is, of course, a well-known filler for paper to be used for writing or printing, but the proportion clay:cellulose which it then forms is much lower than in the paper of the present invention. The clay known as ball clay, which like kaolin contains a high proportion of the mineral kaolinite and has been proposed (see our UK patent application No. 2 089 857A) for use in thermally insultant corrugated paper for domestic hot water boilers, cannot be used as replacement for china clay in the above formulation, because it gives rise to a product which is too brittle and inflexible for use in a spiral wound gasket.

The vitreous fibre in wool form eg mineral wool or glass wool, provides reinforcement for the finished paper, and also assists web-formation and drainage on the water-permeable conveyor.

The graphite improves the shear resistance of the paper, and this improvement is important when, after winding the steel strip of the spiral wound gasket, the tension on it is slightly relaxed so as to obtain a spiral with the required degree of resilience in the plane of the gasket. The preferred proportion of graphite by dry weight of the aqueous slurry is 15–35%. The synthetic resin polymer binder is suitably of the acrylic type. Suitable acrylic resins are available in the form of synthetic polymer latices consisting of a fine suspension in water of a copolymer based on an acrylic ester as the principal monomer.

The density of the paper produced will ordinarily be in the range 800–1200 kg/m$^3$.

The invention is further illustrated by the following Example.

EXAMPLE

This Example illustrates the preparation of a non-asbestos gasket paper from an aqueous slurry of the following composition:

|  | % by weight |
| --- | --- |
| china clay | 32 |
| chlorite | 30 |
| graphite | 23 |
| cellulose fibres | 5 |
| mineral wool | 5 |
| acrylic resin | 5 |
|  | 100 |

A Preparation of Slurry i. Lapponia pulp (bleached softwood sulphate pulp) in sheet form was made into an aqueous slurry of solids content about 3% by weight and treated in a disc refiner until its freeness was 80° Schopper Riegler.

ii. The pulp of i (1 kg dry weight=34 kg wet weight) was added to 91 liters of water at 45° C. in a mixing tank, and the diluted pulp was agitated vigorously for 1 minute. There were then successively added, with vigorous stirring:
    mineral wool: (1 kg)
    chlorite: (6 kg; nominally 98% passing a sieve of aperture 250 μm diameter)
    china clay: (6.4 kg; pH 5; particle size such that less than 0.05% by weight was retained on a sieve of aperture 53 μm diameter)
    graphite: (4.6 kg; carbon content 98; particle size such that at least 96% passed a sieve of aperture 90 μm diameter)
and, after a further 2 minutes agitation, a further 227 liters of water at 45° C. was added.

There was then added 2.2 liters of a commercially available aqueous acrylic resin latex (an anionic emulsion of a self-crosslinking acrylic polymer; pH 4; solids content 45.5%, glass transition temperature of air-dried film −25° C.; curing at 120° C. or below), diluted with 5 times its own volume of cold water.

The pH of the slurry in the mixer was then reduced to about 4.6 by the addition of papermakers alum (aluminum sulphate). The supernatant liquid that remained when stirring was stopped was clear, indicating that the dispersed particles of the latex had all been precipitated onto the cellulose particles and the fine particles of china clay, graphite and chlorite, and the mineral wool. A further 50 liters of water at 45° C. was then added.

B Preparation of Paper

The slurry of A above was made into flexible sheet material in an entirely conventional way, using conventional anionic polyacrylamide flocculating agent and anti-foaming agent, on a Fourdrinier flat wire paper machine, such as is described in chapters 10 and 11 of "Paper and Board Manufacture" by Julius Grant, James H. Young and Barry G. Watson (Publishers; Technical Division, The British Paper and Board Industry Federation, London 1978). The slurry is progressively dewatered as it travels on the water-permeable conveyor of the machine, and the dewatered material is consolidated by pressing between rollers. The sheet material thus formed is dried on heated cylinders and wound into reels.

The properties of flexible sheet material obtained from the slurry of A were:

| Thickness | mm | 0.51 |
|---|---|---|
| Mass/Unit area | g/m$^2$ | 510 |
| Density | kg/m$^3$ | 1000 |
| Tensile strength | | |
| Machine direction | MPa | 3.0 |
| Cross direction | MPa | 2.7 |
| Compression at 6.89 MPa | % | 34 |
| Recovery from Compression | % | 17 |

Tensile Strength: British Standard BS 3057, Appendix F Compression, and recovery from compression: ASTM F 36-66 Density: BS 3057, Appendices C (substance) and B (thickness); whence density, from d=substance ÷ thickness.

Flexible sheet material made as just described was made up into spiral wound gaskets, which were then incorporated into bolted flanged assemblies. These assemblies were subjected to thermal cycling tests with nitrogen as follows:

| | Temperature | Pressure | Period of exposure at listed temperature |
|---|---|---|---|
| heat to: | 460° C. | 21 bar | 1 hour |
| cool to: | 80° C. | 10 bar | 1½ hours |
| raise again to: | 460° C. | 21 bar | 1 hour |

The assemblies were thus leak-proof

We claim:

1. Non-asbestos flexible sheet material made by dewatering on a water-permeable conveyor a layer of aqueous slurry and compressing and drying the dewatered layer, the aqueous slurry employed being one that contains the following ingredients in the following proportions by dry weight:
   china clay: 20-40%
   mica or chlorite: 20-50%
   graphite: 10-40%
   cellulose fibres: 2-10%
   vitreous fibre in wool form: 2-10%
   synthetic organic polymer binder: 2-10%

2. A spiral wound gasket which incorporates non-asbestos flexible sheet material according to claim 1.

* * * * *